United States Patent
Chen et al.

(10) Patent No.: US 8,094,716 B1
(45) Date of Patent: Jan. 10, 2012

(54) METHOD AND APPARATUS OF ADAPTIVE LAMBDA ESTIMATION IN LAGRANGIAN RATE-DISTORTION OPTIMIZATION FOR VIDEO CODING

(75) Inventors: Lulin Chen, Cupertino, CA (US); Ilie Garbacea, Santa Clara, CA (US)

(73) Assignee: Maxim Integrated Products, Inc., Sunnyvale, CA (US)

( * ) Notice: Subject to any disclaimer, the term of this patent is extended or adjusted under 35 U.S.C. 154(b) by 1322 days.

(21) Appl. No.: 11/268,803

(22) Filed: Nov. 8, 2005

Related U.S. Application Data

(60) Provisional application No. 60/725,587, filed on Oct. 11, 2005, provisional application No. 60/711,238, filed on Aug. 25, 2005.

(51) Int. Cl.
*H04N 7/12* (2006.01)

(52) U.S. Cl. ......... 375/240.03; 375/240.01; 375/240.16; 375/240.18

(58) Field of Classification Search ............. 375/210.01, 375/240.03, 240.16, 240.18, 240.3
See application file for complete search history.

(56) References Cited

U.S. PATENT DOCUMENTS

| | | | | |
|---|---|---|---|---|
| 2002/0090027 A1* | 7/2002 | Karczewicz et al. | .... | 375/240.01 |
| 2004/0131121 A1* | 7/2004 | Dumitras et al. | ........ | 375/240.16 |
| 2005/0123038 A1* | 6/2005 | Otsuka et al. | ............ | 375/240.03 |

OTHER PUBLICATIONS

Rate-Contrained Coder Control and Comparison of Video Coding Standards (2003, IEEE).*
Wiegand, T., et al., "Rate-Constrained Coder Control and Comparison of Video Coding Standards", IEEE Transactions on Circuits and Systems for Video Technology, vol. 13, No. 7, Jul. 2003, pp. 688-703.
Wiegand, T., et al., "Lagrange Multiplier Selection in Hybrid Video Coder Control", in Proc. ICIP 2001, Thessaloniki, Greece, Oct. 2001, pp. 1-4.
Sullivan, Gary J., et al., "Rate-Distortion Optimization for Video Compression", IEEE Signal Processing Magazine, Nov. 1998, pp. 74-90.
Ortega, Antonio, et al., "Rate-Distortion Methods for Image and Video Compression", IEEE Signal Processing Magazine, Nov. 1998, pp. 23-50.
He, Zhihai, et al., "A Unified Rate-Distortion Analysis Framework for Transform Coding", IEEE Transaction on Circuits and Systems for Video Technology, vol. 11, No. 12, Dec. 2001, pp. 1221-1236.
He, Zhihai, et al., "Optimum Bit Allocation and Accurate Rate Control for Video Coding via p-Domain Source Modeling", IEEE Transactions on Circuits and Systems for Video Technology, vol. 12, No. 10, Oct. 2002, pp. 840-849.

* cited by examiner

*Primary Examiner* — Vu Le
*Assistant Examiner* — Amara Abdi
(74) *Attorney, Agent, or Firm* — North Weber & Baugh LLP

(57) ABSTRACT

A method for hybrid video coding is disclosed. The method generally includes the steps of (A) calculating a bit rate based on a percentage of quantized zero coefficients resulting from encoding a plurality of components of a video signal, (B) calculating a distortion based on the percentage of quantized zero coefficients, (C) calculating a plurality of variances of a plurality of prediction error pictures and (D) calculating an adaptive Lagrangian multiplier in a Lagrangian rate-distortion optimization as a function of the bit rate, the distortion and the variance to minimize a Lagrangian cost.

20 Claims, 5 Drawing Sheets

METHOD AND APPARATUS OF ADAPTIVE LAMBDA ESTIMATION IN LAGRANGIAN RATE-DISTORTION OPTIMIZATION FOR VIDEO CODING

This application claims the benefit of (i) U.S. Provisional Application No. 60/711,238, filed Aug. 25, 2005 and (ii) U.S. Provisional Application No. 60/725,587, filed Oct. 11, 2005, both of which are hereby incorporated by reference in their entirety.

FIELD OF THE INVENTION

The present invention relates to a method and/or architecture for video encoding generally and, more particularly, to a method and/or apparatus for an adaptive lambda estimation in a Lagrangian rate-distortion optimization for video coding.

BACKGROUND OF THE INVENTION

In hybrid video coding, such as H.263, MPEG-2/4 and H.264, a Lagrangian rate-distortion optimization (RDO) can be used for motion estimations, adaptive field-frame decisions and mode decisions in bit rate allocation. The Lagrangian RDO minimizes a Lagrangian cost J(D, R) as a function of a distortion (D) and a bit rate (R). The Lagrangian cost is determined by equation 1 as follows:

$$J(D,R) = D + \lambda R \quad \text{Eq. (1)}$$

In equation 1, $\lambda$ (lambda) is referred to as a Lagrangian multiplier. A good selection or adaptive estimation of $\lambda$ leads to an efficient coder control. Based on experimental data, assumptions of the rate-distortion (R-D) model and the distortion approximation, $\lambda$ has been resolved for coding in accordance with the H.263 standard per equation 2 as follows:

$$\lambda = cQ^2 \quad \text{Eq. (2)}$$

where Q is a quantization step parameter in the H.263 standard and c is a constant. The constant c is typically set to a value of 0.85. For the H.264 standard, $\lambda$ is calculated per equation 3 as follows:

$$\lambda = c2^{((Q-12)/3)} \quad \text{Eq. (3)}$$

where Q is a quantization parameter in the H.264 standard.

SUMMARY OF THE INVENTION

The present invention concerns a method for hybrid video coding. The method generally comprises the steps of (A) calculating a bit rate based on a percentage of quantized zero coefficients resulting from encoding a plurality of components of a video signal, (B) calculating a distortion based on the percentage of quantized zero coefficients, (C) calculating a plurality of variances of a plurality of prediction error pictures and (D) calculating an adaptive Lagrangian multiplier in a Lagrangian rate-distortion optimization as a function of the bit rate, the distortion and the variance to minimize a Lagrangian cost.

The objects, features and advantages of the present invention include providing a method and/or apparatus for adaptive lambda estimation in a Lagrangian rate-distortion optimization for video coding that may (i) calculate an adaptive Lagrangian multiplier in a $\rho$ (rho) domain, (ii) calculate an adaptive value for a constant (e.g., "c") used in conventional Lagrangian multiplier estimations and/or (iii) calculate a Lagrangian multiplier based on a percentage of quantized zero coefficients for a video signal.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
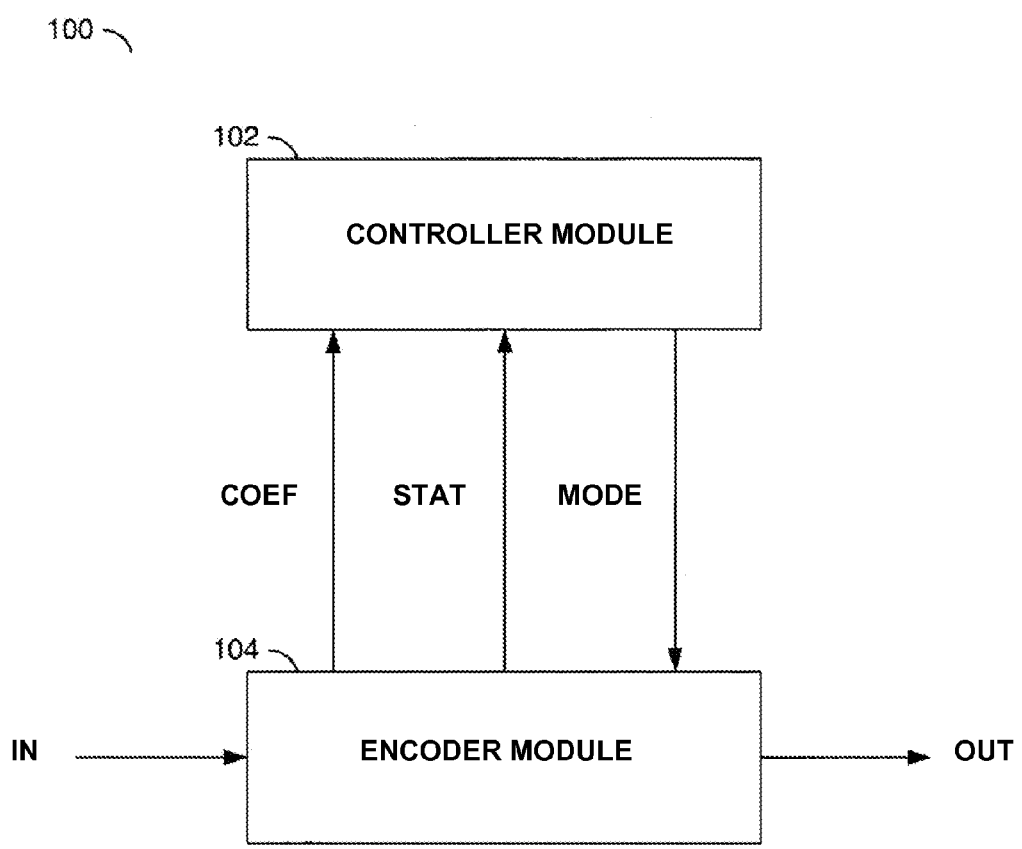
FIG. 1 is a block diagram of a circuit in accordance with a preferred embodiment of the present invention.

Referring to FIG. 1, a block diagram of a circuit 100 is shown in accordance with a preferred embodiment of the present invention. The circuit (or system) 100 may be referred to as an encoder system. The encoder system 100 generally comprises a module (or block) 102 and a module (or block) 104. A signal (e.g., IN) may be received by the module 104. A signal (e.g., OUT) may be generated and presented by the module 104. The module 104 may generate a signal (e.g., VAR). The signal VAR may be presented from the module 104 to the module 102. The module 104 may also generate a signal (e.g., COEF). The signal COEF may be presented from the module 104 to the module 102. A signal (e.g., STAT) may be presented from the module 104 to the module 102. A signal (e.g., MODE) may be generated by the module 102. The signal MODE may be presented from the module 102 to the module 104.

The encoder system 100 may be operational to encode an unencoded digital video content carried by the signal IN to generate a compressed bitstream in the signal OUT. In some embodiments, the encoded bitstream may be compliant with an H.264/AVC standard. The H.264/AVC standard is published by Joint Video Team (JVT) of the International Organization for Standardization/International Electrotechnical Commission (ISO/IEC) Moving Picture Experts Group (MPEG) and the Video Coding Expert Group (VCEG) of the International Telecommunications Union-Telecommunications (ITU-T) Standardization Sector, Geneva, Switzerland. In other embodiments, the encoded bitstream may be compliant with an H.263 standard, also published by the ITU-T. In still other embodiments, the encoded bitstream may be compliant with an MPEG-2 standard or an MPEG-4 standard, published by the ISO/IEC MPEG, Geneva, Switzerland. Other standards suitable for rate-distortion optimization may be used for the encoded bitstream to meet the criteria of a particular application.

The signal IN may carry unencoded digital video information. The digital video information generally comprises a sequence of unencoded pictures (e.g., frames and/or fields) received in a display order at a particular frame rate and/or field rate. The unencoded pictures generally have two or more components that may undergo the rate-distortion optimization by the encoder system 100.

The signal OUT may carry a bitstream of compressed video information. In some embodiments, the signal OUT may be optimized for minimum distortion at a given bit rate. In other embodiments, the signal OUT may be optimized for a minimum bit rate at a given distortion value. The signal OUT may undergo additional processing in the encoder system 100 before being transmitted and/or stored.

The signal VAR may carry variance information. The variance information may be for a prediction error picture. The prediction error picture may be based on a current picture being encoded and/or one or more prior pictures previously encoded. The variance may be measured in terms of a sum of absolute differences or a sum of absolute differences squared.

The signal COEF may carry coefficients of a video signal component that has been (i) discrete cosine transformed (DCT) or a DCT-like integer transform and (ii) quantized based on a quantization parameter (e.g., Q). The quantization may result in several of the coefficients generated by the DCT having values of zero. The ρ-domain used for a rate model and a distortion model may be based on a percentage of the quantized zero coefficients (e.g., quantized DCT coefficients having a value of zero).

The signal MODE may carry settings used to instruct the encoder module 104 how to encode a current picture. The settings may include, but are not limited to, macroblock coding modes, an adaptive field-frame (AFF) mode, a macroblock adaptive field-frame (MBAFF) mode, the quantization parameter Q, intra coding mode, predicted coding mode, bidirectional coding mode and the like.

The signal STAT generally comprises statistical information gathered by the module 104. The statistical information may be based on a current encoding of current pictures and/or a prior encoding of one or more previous pictures.

The module 102 may be referred to as a controller module. The controller module 102 may be operational to provide overall control of an encoding process for the signal IN. The control may include a Lagrangian rate-distortion optimization function for two or more components in the signal IN. The controller module 102 may generate the signal MODE commanding the module 104 to encode in such a way as to minimize distortion. The minimized distortion may be determined by the Lagrangian rate-distortion optimization for a predetermined target bit rate. In some embodiments, the controller module 102 may generate the signal MODE to command an encoding that minimizes the bit rate for a predetermined target distortion.

The module 104 may be referred to as an encoding module. The encoding module 104 may be operational to encode the signal IN to generate the signal OUT based on the signal MODE. The encoding module 104 may be further operational to calculate a variance value for the signal OUT. The variance value may be calculated as any one of a variety of variance estimations. For example, the variance may be calculated over an entire original picture before coding. In another example, the variance may be calculated over a predicted error picture. The variance value may be presented to the controller module 102 in the signal VAR. The encoding module 104 may also calculate a percentage of quantized zero coefficients in a current coding and/or a historical coding. The percentage of quantized zero coefficients may be presented to the controller module 102 in the signal COEF.

In the Lagrangian RDO as described above, changes in a value of λ generally affects a bit rate and a distortion/peak signal to noise ratio (PSNR) of the coded pictures. The value of λ is generally adapted to the coding input characteristics and encoding statistics in an analytical way.

The adaptive λ estimation may be based on a linear rate model and a distortion model. A ρ-domain (rho-domain) rate model is generally computed by equation 4 as follows:

$$R(\rho)=\theta(1-\rho) \quad \text{Eq. (4)}$$

where R may be a bit rate, θ (theta) may be a coding constant and ρ (rho) may be a percentage of quantized zero coefficients. A ρ-domain distortion module may be computed by equation 5 as follows:

$$D(\rho,\sigma)=\sigma^2 e^{\hat{}}(-\alpha(1-\rho)) \quad \text{Eq. (5)}$$

Where D may be a distortion, $\sigma^2$(sigma) may be a variance of prediction error picture and α (alpha) may be a coding constant.

Minimizing J(D, R) generally sets a derivative to zero which yields equation 6 as follows:

$$\lambda=-dD/dR \quad \text{Eq. (6)}$$

Combining with equation 4 and equation 5, the Lagrangian multiplier may be expressed by equations 7 and/or 8 as follows:

$$\lambda=-dD/d\rho/dR/d\rho=\alpha D/\theta \quad \text{Eq. (7)}$$

$$\lambda=\ln(\sigma^2/D)D/R \quad \text{Eq. (8)}$$

From equation 8, λ is generally adaptive to $\sigma^2$—a coding input characteristic, D—the coding distortion and R—the bit rate. Rewriting equation 2 produces equation 9 as follows:

$$\lambda=cQ^2=c3D \quad \text{Eq. (9)}$$

where $D=Q^2/3$. By combining equation 9 with equations 7 and 8, an adaptive value of c may be computed per equations 10 and/or 11 as follows:

$$c=\alpha/3\theta \quad \text{Eq. (10)}$$

$$c=\ln(\sigma^2/D)/3R \quad \text{Eq. (11)}$$

To generalize equations 8 and 11, a number of factors (e.g., factors β (beta), δ (delta), $k_0$ and $m_0$) may be added in equations 8 and 11 to yield equations 12 and 13 as follows:

$$\lambda=\beta(\ln(\sigma^2/D)+\delta)D/R+k_0 \quad \text{Eq. (12)}$$

$$c=\beta(\ln(\sigma^2/D)+\delta)/3R+m_0 \quad \text{Eq. (13)}$$

In general, the parameters β, δ, $k_0$ and $m_0$ may be coding constants. The parameters β and δ may relate to a system calibration and a method of collecting the coding statistics. The parameters $k_0$ and $m_0$ may relate to coding tools. In various embodiments, the constant β is set in a range of approximately 0.5 to 1. The constant δ may be set in a range of approximately 0.7 to 0. In equations 12 and 13, current statistics or/and previous coding statistics of $\sigma^2$, D and R may be used to compute λ and c in terms of the application. Values for the parameters β, δ, $k_0$ and $m_0$ may be determined empirically. For example, the adaptive estimation method may be modeled and then compared to reference video sequences. The values for the parameters β, δ, $k_0$ and $m_0$ may be adjusted to align the models with actual results.

Figure 2:
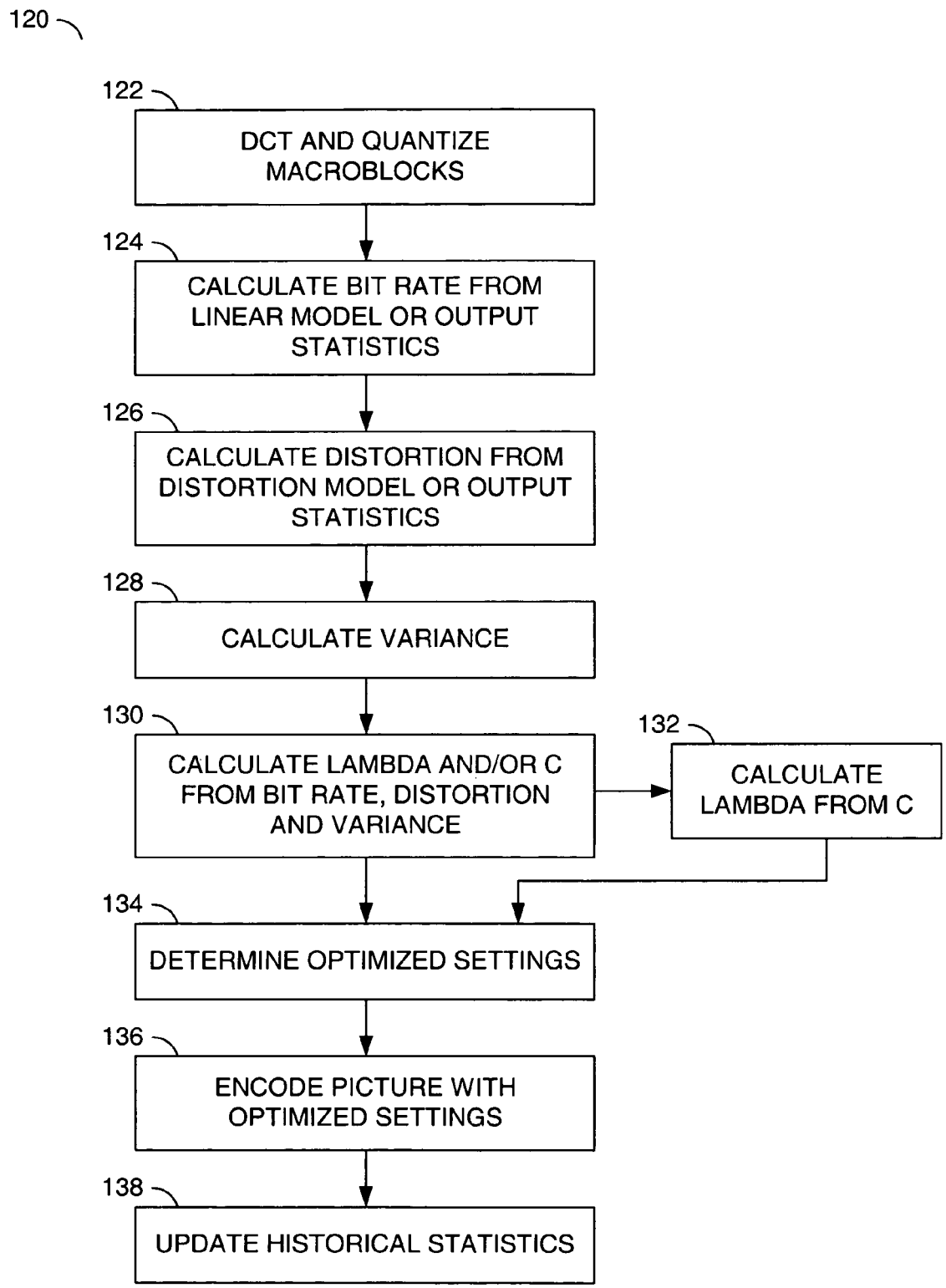
FIG. 2 is a flow diagram of an example method for hybrid video encoding.

Referring to FIG. 2, a flow diagram of an example method 120 for hybrid video encoding is shown. The method (or process) 120 generally comprises a step (or block) 122, a step (or block) 124, a step (or block) 126, a step (or block) 128, a step (or block) 130, a step (or block) 132, a step (or block) 134, a step (or block) 136 and a step (or block) 138. The method 120 may be referred to as a hybrid coding method. Individual steps of the hybrid coding method 120 may be allocated between the controller module 102 and the encoder module 104 of the encoder system 100.

The hybrid coding method 120 generally includes performing a discrete cosine transform (DCT) and quantization on multiple components of a picture by the encoder module 104 in the step 122. The quantization may generate one or more DCT coefficients having a value of zero. The DCT coefficient information may be passed to the controller module 102 via the signal COEF. In the step 124, the controller module 102 may calculate bit rates for the components based on a linear model or output statistics using the quantized zero coefficients as an input. In the step 126, the controller module 102 may calculate a distortion for the encoding based on a distortion model or output statistics using the quantized zero coefficients. In the step 128, the encoder module 104 may calculate a variance of the components of the video signal. The variance may be transferred via the signal VAR to the controller module 102.

The Lagrangian multiplier λ or a conventional "constant" c may be calculated by the controller module 102 in the step 130 based on the variance, the distortion and the bit rate per equation 12 and/or 13. In some embodiments where the conventional constant c was calculated, the controller module 102 may generate the Lagrangian multiplier λ based on the constant c and the quantization (step) parameter Q (e.g., Q for either the H.263 standard or Q for the H.264 standard).

In the step 134, the controller module 102 may compare multiple groups of coding setting to determine which group has either (i) a minimum distortion or (ii) a minimum bit rate. The group of coding settings having the sought-after optimization may be passed along to the encoder module 104 in the signal MODE. The encoder module 104 may then encode the components of the video signal IN per the optimized settings.

The components of the video signal used in the optimization generally include, but are not limited to macroblocks, fields, frames, blocks within the pictures, groups of pictures, coding elements impacted by the selected modes and such. The selected modes may include an adaptive field-frame (AFF) mode, a macroblock adaptive field-frame (MBAFF) mode, intra-coding modes (e.g., 9 intra modes) and inter-coding modes (e.g., 7 inter modes). Other "mode" information may include values for the quantization parameters.

The encoder module 104 may keep track of one or more statistical parameters while encoding each picture within the signal IN. Based on the statistics gathered, the encoder module 104 may update the statistics stored internally regarding a performance of encoding the pictures. The statistics may be transferred to the controller module 102 via the signal STAT. The controller module 102 may use the statistics in adjusting the mode control settings for new encodings of new pictures from the signal IN.

Figure 3:
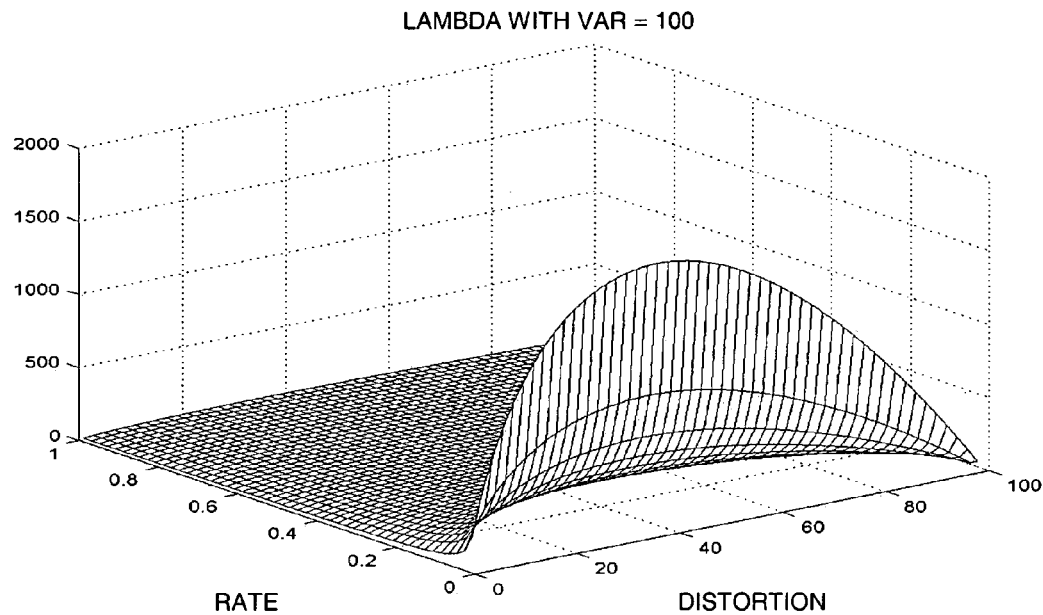
FIGS. 3-5 are three-dimensional plot diagrams of example adaptations.
Figure 4:
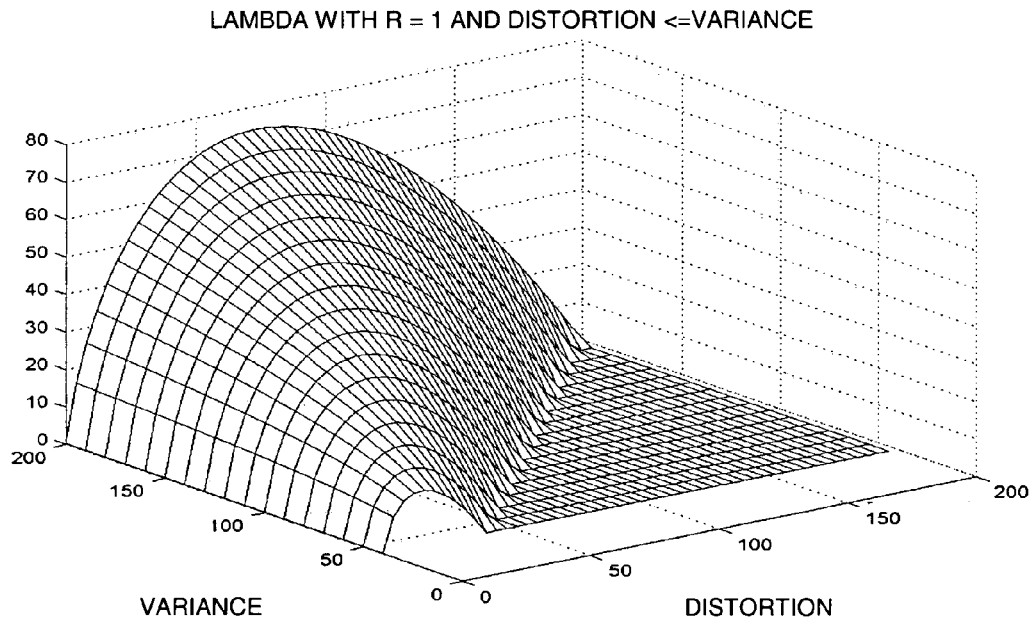
Figure 5:
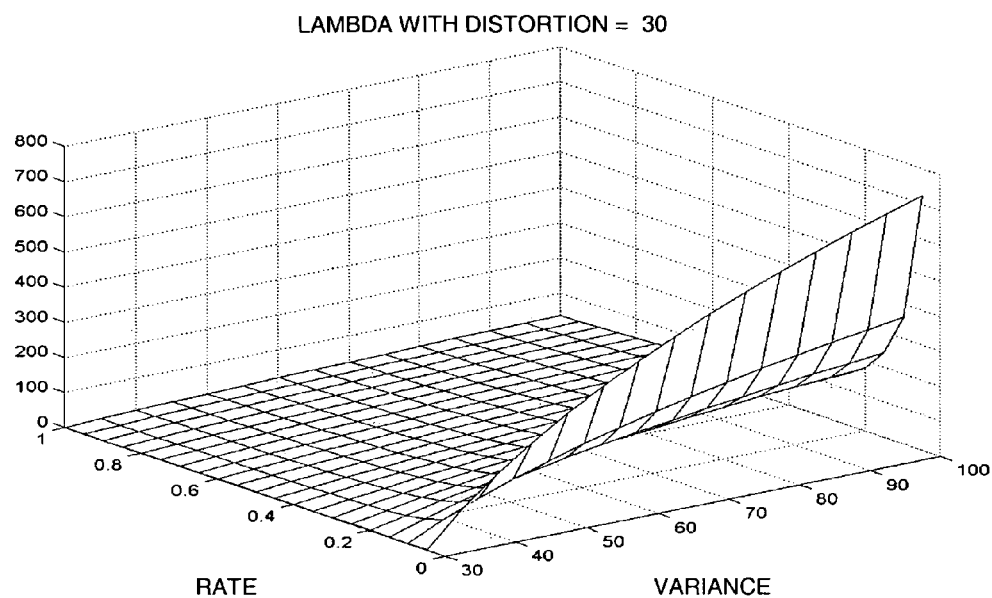

Referring to FIGS. 3-5, three-dimensional plot diagrams of example adaptations are shown. The adaptations generally use the settings of β=1, δ=0 and $k_0$=0. The plot illustrated in FIG. 3 may set the variance $\sigma^2$ to 100. The plot illustrated in FIG. 4 may fix the rate R to 1. The plot illustrated in FIG. 5 is a case when the distortion D may be fixed to 30. The FIGS. 3-5 generally do not show all combinations of the variables $\sigma^2$, R and D as the variables may be dependent variables.

The above lambda estimation method may be applied to mode selection of an adaptive frame-field (AFF) coding of the video signal IN. In such a case, the different components of the video signal being optimized may be the different pictures coded per the AFF. Furthermore, the lambda estimation method may be applied to mode selection of a macroblock adaptive frame-field (MBAFF) coding of the video signal. For MBAFF coding, the different components of the video signal may be the individual macroblock pairs identified for either frame encoding or field encoding.

Figure 6:
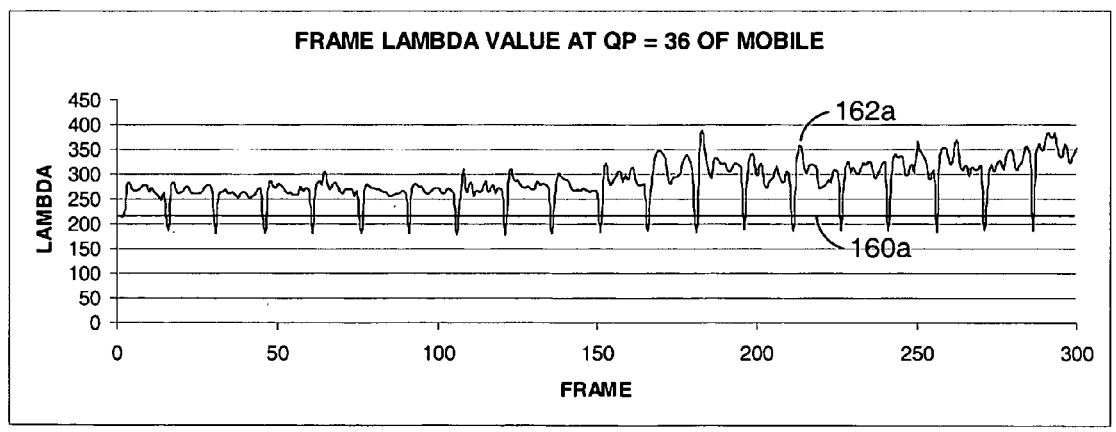
FIGS. 6-7 are diagrams of simulated adaptive estimations.
Figure 7:
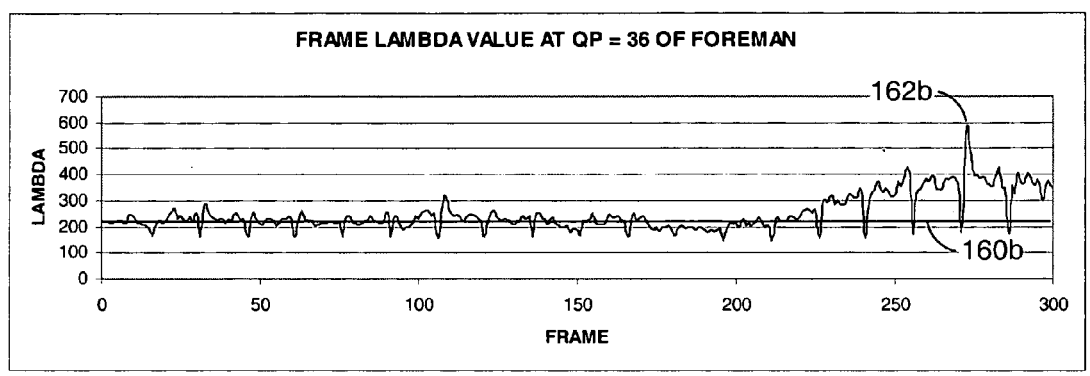

Referring to FIGS. 6 and 7, diagrams of simulated adaptive estimations are shown. Testing of the lambda estimation method was conducted using an H.264/AVC reference JM10 software encoder model with the baseline profile and a constant quantization parameter setting. The test sequences generally utilize standards Mobile and Foreman at a common intermediate format (CIF) resolution. As in the JM reference software, once the lambda value for mode decision (e.g., $\lambda_{MODE}$) is selected, the lambda value for motion estimation (e.g., $\lambda_{MOTION}$) is generally set to $\lambda_{MOTION}=(\lambda_{MODE})^{1/2}$. In equation 12, β=0.7, δ=0.5 and $k_0$=0 may be empirical settings for the experiment. The previous frame coding statistics are generally used in equation 12 to estimate $\lambda_{MODE}$ for current frame. For a P-frame, the skipped macroblocks may be excluded from the variance and distortion calculation since the skipped macroblocks may skew the distortion model when the number of the skipped macroblocks goes higher.

The FIGS. 6 and 7 generally show the actual lambda values used in encoding. The encoder may start with λ calculated as in equation 3. The lines 160a-160b in the figures may be the λ values in terms of equation 3 as the quantization parameter is constant. The lines 162a-162b generally illustrate (i) different λ values for I-frames and P-frames and (ii) different λ values for different coding input per equation 12. The lines 162a-162b generally illustrate the adaptation of λ per the present invention.

The function performed by the flow diagram of FIG. 2 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMS, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

The invention claimed is:

1. A method for hybrid video coding, comprising the steps of:
   (A) receiving a video signal at a first interface of an encoder;
   (B) calculating bit rate based on a percentage of quantized zero coefficients resulting from encoding a plurality of components of the video signal;
   (C) calculating a distortion based on said percentage of quantized zero coefficients;
   (D) calculating a plurality of variances of a plurality of prediction error pictures; and
   (E) calculating an adaptive Lagrangian multiplier in a Lagrangian rate-distortion optimization, within a controller module external to an encoding loop within the encoder, as a function of said bit rate, said distortion and said variance to minimize a Lagrangian cost.

2. The method according to claim 1, further comprising the step of:
   encoding said video signal based on said Lagrangian rate-distortion optimization.

3. The method according to claim 1, wherein said adaptive Lagrangian multiplier is proportional to a natural logarithm of said variance.

4. The method according to claim 3, wherein said adaptive Lagrangian multiplier is proportional to said distortion.

5. The method according to claim 4, wherein said adaptive Lagrangian multiplier is inversely proportional to said bit rate.

6. The method according to claim 5, wherein said adaptive Lagrangian multiplier is proportional to a natural logarithm of an inverse of said bit rate.

7. The method according to claim 6, further comprising the step of:
Scaling said adaptive Lagrangian multiplier by a scale constant of approximately unity.

8. The method according to claim 1, wherein said components of said video signal; are based on a plurality of quantization parameters.

9. The method according to claim 1, wherein said components of said video signal are based on a mode selection for an adaptive frame-field coding.

10. The method according to claim 1, wherein said components of said video signal are based on a mode selection for a macro block adaptive frame-field coding.

11. A method for hybrid video coding, comprising the steps of:
(A) receiving a video signal at a first interface of an encoder;
(B) calculating a bit rate based on a percentage of quantized zero coefficients resulting from encoding a plurality of components of the video signal;
(C) calculating a distortion based on said percentage of quantized zero coefficients;
(D) calculating a plurality of variances of a plurality of prediction error pictures;
(E) calculating an adaptive value as a function of said bit rate, said distortion and said variance for approximating a Lagrangian multiplier in a Lagrangian rate-distortion optimization; and
(F) calculating said Lagrangian multiplier, within a controller module external to an encoding loop within the encoder, as a function of said adaptive value to minimize a Lagrangian cost.

12. The method according to claim 11, wherein said Lagrangian multiplier is proportional to a quantization parameter squared.

13. The method according to claim 11, further comprising the steps of:
Encoding said video signal; based on said Lagrangian rate-distortion optimization.

14. The method according to claim 11, wherein said adaptive value is proportional to a natural logarithm of said variance.

15. The method according to claim 14, wherein said adaptive value is proportional to said distortion.

16. The method according to claim 15, wherein said adaptive value is inversely proportional to said bit rate.

17. A system comprising:
a controller module configured to (i) calculate a bit rate based on a percentage of quantized zero coefficients resulting from encoding a plurality of components of a video signal, (ii) calculate a distortion based on said percentage of quantized zero coefficients, (iii) calculate a plurality of variances of a plurality of prediction error pictures and (iv) calculate an adaptive value for a Lagrangian multiplier in a Lagrangian rate-distortion optimization as a function of said bit rate, said distortion and said variance to minimize a Lagrangian cost; and
an encoder module configured to (i) generate said quantized coefficients and (ii) generate said variances.

18. The system according to claim 17, wherein said encoder module is further configured to perform an adaptive frame-field coding based on said Lagrangian rate-distortion optimization.

19. The system according to claim 17, wherein said encoder module is further configured to perform a macroblock adaptive frame-filed coding based on said Lagrangian rate-distortion optimization.

20. The system according to claim 19, wherein said components of said video signal comprise macroblocks.

* * * * *